United States Patent [19]

Christiansen et al.

[11] Patent Number: 5,342,593
[45] Date of Patent: * Aug. 30, 1994

[54] PROCESS FOR ABSORPTION OF SULFUR COMPOUNDS FROM FLUIDS

[75] Inventors: Steven H. Christiansen, Richwood; Dane Chang, Houston; David A. Wilson, Richwood, all of Tex.

[73] Assignee: The Dow Chemical Company, Midland, Mich.

[*] Notice: The portion of the term of this patent subsequent to May 28, 2008 has been disclaimed.

[21] Appl. No.: 927,584

[22] Filed: Aug. 10, 1992

Related U.S. Application Data

[63] Continuation-in-part of Ser. No. 569,091, Aug. 16, 1990, abandoned.

[51] Int. Cl.$^5$ .............................................. B01D 53/34
[52] U.S. Cl. ........................ 423/242.6; 423/242.7; 210/634
[58] Field of Search ............ 423/242.2, 242.4, 242.6, 423/242.7, 226; 210/634

[56] References Cited

U.S. PATENT DOCUMENTS

| | | | |
|---|---|---|---|
| 3,856,921 | 12/1974 | Shrier et al. | 423/228 |
| 3,878,199 | 4/1975 | Beale, Jr. | 540/492 |
| 3,966,711 | 6/1976 | Rasberger | 540/492 |
| 4,100,256 | 7/1978 | Bozzelli et al. | 423/220 |
| 4,112,049 | 9/1978 | Bozzelli et al. | 423/226 |
| 4,366,134 | 12/1982 | Korosy et al. | 423/243 |
| 4,465,614 | 8/1984 | Trentham et al. | 252/364 |
| 4,469,663 | 9/1984 | Crump et al. | 423/242 |
| 4,530,704 | 7/1985 | Jones et al. | 55/48 |
| 4,767,860 | 8/1988 | Dunmore et al. | 544/384 |
| 4,783,327 | 11/1988 | Treybig et al. | 423/243 |
| 4,814,443 | 3/1989 | Treybig et al. | 540/492 |
| 4,980,471 | 12/1990 | Christiansen et al. | 544/384 |
| 5,019,365 | 5/1991 | Bedell | 252/403 |
| 5,057,293 | 10/1991 | Epperly et al. | 423/242.4 |
| 5,098,681 | 3/1992 | Christiansen et al. | 423/243 |
| 5,108,723 | 4/1992 | Chang et al. | 423/540 |
| 5,167,941 | 12/1992 | Bedell | 423/242.2 |

FOREIGN PATENT DOCUMENTS

| | | | |
|---|---|---|---|
| 1101280 | 7/1984 | U.S.S.R. | 423/242.6 |
| 450519 | 1/1935 | United Kingdom | 423/228 |

OTHER PUBLICATIONS

Kirk-Othmer, *Encyclopedia of Chemical Technology*, vol. 7, pp. 397-405, (1979).
Kirk-Othmer, *Encyclopedia of Chemical Technology*, vol. 4, p. 762. (1979).
Kirk-Othmer, *Encyclopedia of Chemical Technology*, vol. 12, pp. 692-711. (1979).
W. Theilheimer, *Synthetic Methods of Organic Chemistry*, vol. 25, p. 215, (1971).
U.S. Application Serial No. 07/623,313, filed Dec. 6, 1990 (the specification thereof).
U.S. Application Serial No. 07/702,795, filed May 17, 1991 (the specification thereof).
Translation of Soviet 1,101,280 (published, in Russian, 1984).

*Primary Examiner*—Wayne Langel
*Assistant Examiner*—Peter T. DiMauro

[57] ABSTRACT

Sulfur dioxide is removed from a fluid containing SO$_2$ by employing as an absorbent therefor an aqueous solution of compound represented by Formula I:

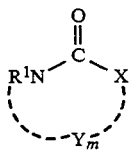

Formula I wherein X is —O—, —NR$^1$—, or —N═; each Y is independently —(CR$^2{}_2$)—, —(C═O)—, —O—, —NR$^1$—, —N═, or —C(R$^2$)═; each R$^1$ or R$^2$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer preferably of from 2 to about 4. The absorbent solution preferably can be thermally regenerated by heating to remove SO$_2$.

29 Claims, No Drawings

PROCESS FOR ABSORPTION OF SULFUR COMPOUNDS FROM FLUIDS

This application is a continuation in part of application Ser. No. 07/569,091, filed Aug. 16, 1990, now abandoned, which is incorporated herein by reference in its entirety.

BACKGROUND OF THE INVENTION

This invention relates to a method for removing sulfur compounds from fluid streams. More particularly, it relates to a method for removing sulfur compounds including sulfur dioxide ($SO_2$) from fluids.

Removal of such sulfur compounds as sulfur dioxide, e.g. from fluids such as industrial and utility gas emissions, is increasingly important. Acid rain is believed to occur when sulfur dioxide in such emissions undergoes chemical changes in the atmosphere and returns to earth with precipitation.

There are numerous techniques for removing sulfur compounds from fluid streams containing them. One common process employs limestone scrubbing. The disadvantage of this process is the necessity of disposing of the large volume of solid waste produced. The wastes are not generally recycled. Another system, taught in U.S. Pat. No. 4,366,134, employs potassium or sodium citrate to selectively remove $SO_2$ from a gas stream. While the wastes from this process can be recycled, recycle is expensive because thermally stable salts are formed and require higher heat for regeneration.

More recent patents teach the use of certain piperazinone derivatives. For instance. U.S. Pat. No. 4,112,049 teaches use of certain piperazinones and N,N'-alkyl piperazinone. In another patent, U.S. Pat. No. 4,530,704, the removal of $SO_2$ from a gas stream is accomplished by contacting a gas stream containing it with an aqueous solution of a piperazinone, morpholinone or N-alkyl substituted derivatives thereof, e.g. N,N'-dimethyl-2-piperazinone. In U.S. Pat. No. 4,783,327 certain hydroxyalkyl substituted piperazinones are taught for use in a similar manner.

Tons such as those formed on admixture of sulfur compounds such as sulfur dioxide with water are known to be removed from fluids such as water by means such as membranes to separate an absorbing solution from a solution having the ions to be removed. For instance, Wisniewska et al., disclose in *Desalination* 56 (1985) pp. 161–173, Amsterdam removal of nitrate from a first solution into a second solution on the opposite side of a membrane from the membrane. Similarly, RAI Research Corporation in *Product & Data Guide, Raipore Membranes*, N.Y. discloses the use of membranes having a solution of potassium hydroxide (an absorbent) on one side to remove sulfate, nitrate and cyanide anions from a solution thereof on the other side of the membrane.

It would be advantageous to have a process for removal of sulfur compounds such as sulfur dioxide which employs an aqueous solution and uses an absorbent which has a high capacity for absorbing sulfur dioxide. The absorbent would desirably be regenerable. It is also desirable that this absorbent has adequate water compatibility at ambient or higher temperatures and its salts are water soluble to avoid inducing scaling or plugging of plant equipment.

SUMMARY OF THE INVENTION

The present invention is a process for removing $SO_2$ from a fluid containing $SO_2$ by employing, as an absorbent for $SO_2$, an aqueous solution of at least one compound represented by Formula I.

DETAILED DESCRIPTION OF THE INVENTION

The compounds useful as absorbents for removing $SO_2$ from fluids are heterocyclic compounds having at least one ring nitrogen atom of Formula I:

Formula I wherein X is —O—, —NR$^1$—, or —N=; each Y is independently —(CR$^2_2$)—, —(C=O)—, —O—, —NR$^1$—, —N=, or —C(R$^2$)=; each R$^1$ or R$^2$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer preferably of from 2 to about 4, more preferably from about 2 to about 3.

In each of the possible R$^1$ or R$^2$ groups, each alkyl group is of a size or molecular weight suitable for use in absorbing sulfur dioxide, preferably in aqueous solutions. Preferably each alkyl group, including the substituted groups such as hydroxyalkyl groups, have from 1 to about 12 carbon atoms, more preferably from 1 to about 6 carbon atoms. Each alkyl group is suitably cyclic, branched or unbranched and optionally is at least partially unsaturated (alkylene groups), e.g. vinyl or allyl groups or substituents.

In Formula I each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, carboxylate groups and ketones; and sulfoxides.

Preferred substituents, R$^1$ and R$^2$, on compounds of Formula I are those which enhance solubility in water, preferably without decreasing the capacity for absorbing $SO_2$, the regenerability of the compound after absorption, or the chemical and heat stability under conditions of use. Preferred substituents are generally hydrogen or alkyl (or alkylene) groups and such groups having at least one hydroxyl group, carboxyalkyl groups or salts thereof, more preferably hydrogen, alkyl groups or alkyl groups having at least one hydroxy group, that is hydroxyalkyl groups, most preferably hydroxyalkyl groups. When R$^1$ or R$^2$ includes a salt, the salt suitably has any positive counterion which allowed solubility in water, preferably such as metal counterion, more preferably an alkali metal counterion or mixtures thereof.

Preferred compounds among compounds of Formula I include hydantoins ($X = -NR^1-$ and $m=2$), triazinones (or N-substituted isocyanuric acids) ($X = -NR^1-$, $m=3$, one of $Y = -NR^1-$), pyrimidinones ($X = -NR^1-$, $m=3$) particularly 2,4-pyrimidinediones, and oxazolidones ($X = -O-$, $m=2$), having the indicated structure.

Among compounds represented by Formula I, hydantoins are preferred because of their ready availability, ease of production from basic raw materials (like ammonia, hydrogen cyanide, carbon dioxide and ketones).

Exemplary of the hydantoins are hydantoin, 5,5-dimethylhydantoin; N-methylhydantoin; N-butylhydantoin; N,N'-dimethylhydantoin; N-(2-hydroxyethyl)hydantoin; N,N'-bis(2-hydroxyethyl)hydantoin; N-hydroxymethylhydantoin, N,N'-bis(hydroxymethyl)hydantoin, N-(2-hydroxyethyl)-5,5-dimethylhydantoin; N,N'-bis(2-hydroxyethyl)-dimethylhydantoin; N-hydroxymethyl-5,5-dimethylhydantoin; N,N'-bis(hydroxymethyl)-5,5-dimethylhydantoin and the like. Preferred compounds include hydantoin 5,5-dialkylhydantoins such as 5,5-dimethylhydantoin; 5-ethyl-5-methylhydantoin; hydroxyalkylated hydantoins and derivatives thereof because such compounds exhibit good solubility, high regenerability, good thermal stability, low vapor pressure (high boiling point), and are readily available in commercial quantities.

Such hydantoins are commercially available and are known in the art. They are prepared by methods within the skill in the art, for instance by processes taught in Kirk-Othmer, *Encyclopedia of Chemical Technology*, Vol. 12, pp. 692–711 (1978).

Exemplary of the triazinones are 1,3,5-triazine-2,4,6-trione; trihydroxy-1,3,5-triazine-2,4,6-trione; trimethyl-1,3,5-triazine-2,4,6-trione; triallyl-1,3,5-triazine-2,4,6-trione and the like. 1,3,5-tris(2-hydroxyalkyl)-2,4,6-triones, and the like are also suitably used. Triallyl-1,3,5-triazine-2,4,6-trione preferred because of relatively high regenerability, good stability, and low vapor pressure (high boiling point).

Triazinones are commercially available and are known in the art. They are prepared by methods within the skill in the art, for instance by procedures such as those taught in *Kirk-Othmer, Encyclopedia of Chemical Technology*, Vol. 7, pp. 397–405 (1979).

Among compounds of Formula I, pyrimidinones, including propyleneureas and pyrimidindiones, are preferred for their solubility in water. Exemplary of the propyleneureas are $N^1,N^3$-dimethyl-propyleneurea; propyleneurea; $N^1$-methyl-propyleneurea; $N^1,N^3$-dimethyl-propyleneurea; $N^1$-(2-hydroxyalkyl)-propyleneurea; $N^1$, $N^3$-bis(2-hydroxyalkyl)-propylene urea; 4,6-dihydroxy-propyleneurea; 4,5-dimethyl-propyleneurea; 2,4-pyrimidinedione; and the like. Hydroxypropyleneureas and especially hydroxyalkyl-propyleneureas are advantageous because of the increased solubility in water resulting from the hydroxyl groups. $N^1,N^3$-dimethyl-propyleneurea is preferred because of relatively high regenerability, good thermal stability, and low vapor pressure. The structural representation of $N^1,N^3$-dimethylpropyleneurea is:

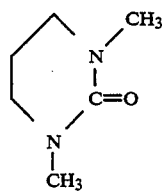

Pyrimidinones are known in the art. They are prepared by methods within the skill in the art, for instance by procedures such as those taught in *Synthetic Methods of Organic Chemistry*, W. Theilheimer, Vol. 25, pp 215, (1971).

Among compounds of Formula I, oxazolidones including oxazolidinediones are preferred for their relatively high solubility as compared to other compounds having the same degree and type of substitution.

Exemplary of the oxazolidones are 2-oxazolidone; 3-methyl-2-oxazolidone; 5-methyl-2-oxazolidone; 3-(2-hydroxyethyl)-2-oxazolidone; 4,5-dimethyl-2-oxazolidone; 3-(2-hydroxyethyl)-4,5-dimethyl-2-oxazolidone; 2,4-oxazolidinedione; 5,5-dipropyl-2,4-oxazolidinedione and the like. 2-oxazolidone is preferred because of relatively high regenerability, low vapor pressure (high boiling point) and good thermal stability.

Oxazolidones are commercially available and are known in the art. They are prepared by methods within the skill in the art, for instance by procedures such as those taught in *Kirk-Othmer Encyclopedia of Chemical Technology*, Vol. 4, p. 762 (1978).

Among compounds of Formula I, preferred compounds are those which have a capacity for absorbing $SO_2$ which, in combination with the water solubility, is suitable for use in aqueous solutions for absorbing $SO_2$. The capacity for absorbing $SO_2$ is determined by saturating a solution of a known concentration of the absorbent in water with $SO_2$, e.g. by sparging $SO_2$ (preferably in a mixture simulating that found in e.g. smokestacks) into the solution. Sparging is continued until the solution has absorbed a maximum amount of $SO_2$ (saturation). Then the concentration of bisulfite (including sulfite that may be present) and bisulfate (including sulfate) ions are determined, e.g. using a standardized commercially available ion chromatograph unit. The concentration of these ions is used to measure $SO_2$ concentration because $SO_2$ is present in water in the form of those ions. Such determinations are within the skill in the art and are exemplified in the Examples of this invention. Capacity is calculated as the mole ratio of absorbed $SO_2$ (as measured by the sum of the moles of bisulfite and bisulfate) to absorbent compound.

The capacity for absorbing $SO_2$ is considered in combination with the water solubility of the compound because the absorbing capacity of a solution is the capacity of the absorbent multiplied by the amount of absorbent present. An arbitrary parameter CS defined as:

$$CS = [\text{Capacity in (moles } SO_2/\text{moles absorbent)}] \times (\text{Solubility in moles absorbent/liter at } 23^\circ \text{ C.})$$

is determined for a potential absorbent. Absorbents used in the practice of the invention preferably have CS of at least about 0.05, more preferably at least about 0.5, most preferably at least 0.7 moles $SO_2$/liter at $23^\circ$ C.

Furthermore, among compounds of Formula I, absorbent compounds having high boiling points relative to water are desirable to prevent overhead loss of the absorbent during a thermal regeneration step.

In the practice of the invention, compounds of Formula I are employed in processes within the skill in the art for employing aqueous solutions of absorbents to absorb $SO_2$. Such processes generally involve contacting the $SO_2$, optionally in solutions or mixtures, gaseous or liquid, with the aqueous absorbent solution either directly or indirectly. Direct contact is exemplified by such processes as those disclosed for using different aqueous absorbents e.g. those disclosed in U.S. Pat. Nos. 4,112,049; 4,530,704; and 4,783,327. Indirect contact is exemplified by but not limited to contact through a membrane, for instance, as exemplified by the teachings of Wisniewska and RAI Research Corporation previously discussed.

The compounds used in the present invention are employed in aqueous solution at a concentration of from about 0.1 weight percent in water up to about their saturation concentration in water at the temperature at which the absorber is operated. The absorbent solution, after use, is preferably thermally regenerated, e.g. by passing steam through the solution, and recycled to the absorption step. The absorber can be operated at a temperature of from about 0° to about 120° C., but is preferably operated at a temperature of from about 5° to about 75° C., most preferably at from about 5° to about 60° C.

Pressures of from about atmospheric to about 10 atmospheres can be employed, but about atmospheric pressure (e.g. 0 to 10 pounds per square inch gauge (psig) (0 to 68.95 pascals (Pa) gauge)is preferably and conveniently employed. Higher temperatures and pressures are not deleterious so long as they are below the decomposition conditions of the absorbent, but equipment design modifications may be required to allow for pressure and temperature resistance. Fluids being treated in the practice of this invention suitably contain any amount of $SO_2$, e.g. from about one ppm (parts per million) (by volume) up to about 100 volume percent, preferably from about 100 ppm to about 3000 ppm (by volume).

Thermal regeneration of the absorbent suitably takes place at any temperature below the thermal decomposition temperature of the absorbent compound, preferably at a temperature of from about 75° C. to about 150° C., most preferably from about 90° C. to about 120° C., at atmospheric pressure. Reduced pressure or pressures above atmospheric are suitable, but about atmospheric pressure (e.g. 0 to 10 pounds per square inch gauge (psig) (0 to 68.95 pascals (Pa) gauge) is convenient. Regeneration at about 100° C. at atmospheric pressure is particularly convenient because water in the aqueous solution boils and can be refluxed while the $SO_2$ is released.

Regenerability of an absorbent is a measure of the ability of the absorbent to release $SO_2$ (so that the absorbent may be reused). Regenerability is determined by measuring the bisulfate and bisulfite concentrations in a solution of known concentration of absorbent which has been saturated with $SO_2$ as in the determination of $SO_2$ absorption capacity. This solution is referred to herein as the enriched solution. Then a portion of the enriched solution is heated to strip $SO_2$ as a gas. For purposes of the measurement, stripping is done at the boiling point of the solution, about 100° C., with $N_2$ sparge at 0.5 SCFH (Standard cubic feet per hour) (equivalent to $1.57 \times 10^{-6}$ m³/s at 16° C. atmospheric pressure) for 4 hours. During the stripping, additional water is frequently added to make up the water loss due to evaporation. A sample of this stripped solution is analyzed for bisulfite and bisulfate concentration by the same method used to analyze the concentration of the original enriched solution. The difference in combined bisulfite and bisulfate concentrations between the stripped and enriched $SO_2$ solution is used to calculate the percent regenerability of each solution using the equation:

$$\% \text{ Regenerability} = \left(1 - \frac{\text{Total bisulfite plus bisulfate concentration in stripped solution}}{\text{Total bisulfite plus bisulfate concentration in enriched solution}}\right) \times 100$$

Percent regenerability of absorbents used in the practice of the invention is preferably at least about 30, more preferably at least about 50, most preferably at least about 60 percent.

The following examples illustrate the use of the absorbent compounds in the process of the invention. All parts, percentages and ratios are by weight unless otherwise stated.

EXAMPLES 1-6

For each of the absorbent compounds listed in Table 1, the amount of compound indicated in the Table is placed into a graduate cylinder and deionized water is added to bring the total volume to 70 (milliliters) at room temperature (23° C.) to form a solution. A 5/95 volume percent mixture of $SO_2$ and $N_2$ (respectively) gases is sparged through a coarse (100–150 micron) gas dispersion tube into the solution at 2.0 standard cubic feet per hour [meaning cubic feet at 60° F. at atmospheric pressure passed per hour (SCFH)] (equivalent to $1.57 \times 10^{-5}$ m³/s at 16° C.) for 4 hours to form an enriched $SO_2$ solution. A small sample of the enriched $SO_2$ solution is analyzed for bisulfite [$HSO_3^-$] and bisulfate [$HSO_4^-$] concentration using a standardized ion chromatograph commercially available from Dionex Corporation under the trade designation Dionex ™ IC Series 4000, equipped with a column packed with AG4-/AS4 resin also commercially available from Dionex Corporation, a conductivity detector commercially available from Wescant, Corp. and a Dionex anion micromembrane suppressor commercially available from Dionex Corp. under the trade designation 8080.

The sum of the sulfite and bisulfate concentrations is used to calculate the $SO_2$ capacity (mole ratio of $SO_2$/absorbent compound) as indicated in the Table.

Then, the remaining $SO_2$ enriched solution is transferred into a flask and heated to boil on a hot plate at about 100° C. with $N_2$ sparge (0.5 SCFH) (equivalent to $1.57 \times 10^{-6}$ m³/s at 16° C.) for 4 hours to strip $SO_2$ as a gas. During the stripping, additional water is frequently added to make up the water loss due to evaporation. A sample of this stripped solution is analyzed for bisulfite and bisulfate concentration by the same method used to analyze the concentration of the original enriched solution. The difference in combined bisulfite and bisulfate concentration between the stripped and original (enriched) $SO_2$ solution is used to calculate the $SO_2$ percent regenerability of each solution using the equation:

% Regenerability =

$$\left(1 - \frac{\text{Total bisulfite plus bisulfate concentration in stripped solution}}{\text{Total bisulfite plus bisulfate concentration in enriched solution}}\right) \times 100$$

The CS, calculated by multiplying the capacity times the solubility in moles liter, is 0.75 for Example 1 and 0.73 for Example 2. The compounds used in Examples 3-6 are used in concentrations less than saturation.

TABLE I

| Example No. | Compound | grams of compound | moles of compound | moles SO$_2$ in enriched solution | SO$_2$ capacity | Moles SO$_2$ in stripped solution | SO$_2$ regenerability % | CS* in moles SO$_2$/liter |
|---|---|---|---|---|---|---|---|---|
| 1 | Hydantoin | 4.326 | 0.0432 | 0.0523 | 1.21 | 0.0028 | 95 | 0.75 |
| 2 | 5,5-Dimethylhydantoin | 10.43 | 0.079 | 0.0511 | 0.65 | 0.0024 | 95 | 0.73 |
| 3 | 2,4-Bis(2-hydroxyethyl)-5,5-dimethylhydantoin | 21 | 0.1117 | 0.1464 | 1.31 | 0.0243 | 83 | 2.09 |
| 4 | N$^1$,N$^3$-Dimethyl-propyleneurea | 21 | 0.1622 | 0.0879 | 0.54 | 0.0114 | 87 | 1.25 |
| 5 | Triallyl-1,3,5-triazine-2,4,6(1H, 3H, 5H)-trione | 21 | 0.0967 | 0.0645 | 0.67 | 0.0137 | 79 | 0.93 |
| 6 | 2-Oxazolidone | 19.177 | 0.2158 | 0.0627 | 0.29 | 0.0097 | 85 | 0.89 |

*The reported CS is that for the concentration used, which in the case of Examples 3,4 and 5 is less than saturation concentration; thus, the reported concentration is less than the true CS at saturation.

The data in Table I show that compounds of Formula I, particularly hydantoins, pyrimidinones, triazinones, and oxazolidones have sufficient capacity and regenerability to be very useful in removing SO$_2$ from fluids.

What is claimed is:

1. A process for removing SO$_2$ from a fluid containing SO$_2$ comprising contacting the SO$_2$ with an aqueous solution of at least one compound represented by Formula I:

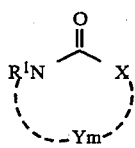

Formula I wherein X is —O—, —NR$^1$—, or —N=; each Y is independently —(CR$^2_2$)—, —(C=O)—, —O—, NR$^1$—, —N=, or —C(R$^2$)=; each R$^1$ or R$^2$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer and wherein the compound is a hydantoin, triazinone, 2,4-pyrimidinedione or oxazolidone, such that SO$_2$ is absorbed into the aqueous solution.

2. A process for removing SO$_2$ from a fluid containing SO$_2$ comprising contacting the SO$_2$ with an aqueous solution of at least one compound represented by Formula I:

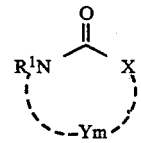

Formula I wherein X is —O—, —NR$^1$— or —N=; each Y is independently —(CR$^2_2$)—, —(C=O)—, —O—, —NR$^1$—, —N=, or —C(R$^2$)=; each R$^1$ or R$^2$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer and wherein the compound is a hydroxyalkylpropyleneurea or hydroxypropyleneurea such that SO$_2$ is absorbed into the aqueous solution.

3. The process of claim 2 wherein at least one of R$^1$ or R$^2$ is selected from hydrogen; alkyl groups or alkylene groups; alkyl groups or alkylene groups having at least one hydroxy group, carboxyalkyl group or salt thereof, and each alkyl group has from 1 to about 6 carbon atoms.

4. The process of claim 2 wherein the compound is selected from the group consisting of N$^1$-(2-hydroxyalkyl)-propyleneurea; N$^1$,N$^3$-bis(2-hydroxyalkyl)-propyleneurea; and 4,6-dihydroxy-propyleneurea.

5. The process of claim 1 wherein the compound is a 2,4-pyrimidinedione.

6. The process of claim 1 wherein the compound is a hydantoin or triazinone.

7. The process of claim 6 wherein at least one of R$^1$ or R$^2$ is selected from hydrogen: alkyl or alkylene groups: alkyl groups having at least one hydroxy group; carboxyalkyl groups or salts thereof; m is from 2 to about 4; and each alkyl group has from 1 to about 6 carbon atoms.

8. The process of claim 7 wherein at least one of R$^1$ or R$^2$ is selected from hydrogen; alkyl groups; or alkyl groups having at least one hydroxy group; and each alkyl group has from 1 to about 6 carbon atoms.

9. The process of claim 6 wherein the compound is a hydantoin.

10. The process of claim 9 wherein at least one of R$^1$ or R$^2$ is selected from the group consisting of hydrogen; alkyl groups; alkyl groups having at least one hydroxy group; carboxyalkyl groups and salts thereof; and each alkyl group has from 1 to about 6 carbon atoms.

11. The process of claim 9 wherein the compound is selected from the group consisting of hydantoin, 5,5-dimethylhydantoin; N-methylhydantoin; N-butylhydantoin; N,N'-dimethylhydantoin; N-hydroxymethylhydantoin, N,N'-bis(hydroxymethyl)hydantoin, N-(2-hydroxyethyl)hydantoin; N,N'-bis(2-hydroxyethyl)hydantoin; N-(2-hydroxyethyl)-5,5-dimethylhydantoin; N,N'-bis(2-hydroxyethyl)dimethylhydantoin; N-hydroxymethyl-5,5-dimethylhydantoin; and bis(hydroxymethyl)-5,5-dimethylhydantoin.

12. The process of claim 11 wherein the compound is selected from the group consisting of 5,5-dimethylhydantoin and 5-ethyl-5-methylhydantoin.

13. The process of claim 6 wherein the compound is a triazinone.

14. The process of claim 13 wherein the compound is selected from the group consisting of 1,3,5-triazine-2,4,6-trione; trihydroxy-1,3,5-triazine-2,4,6-trione; trimethyl-1,3,5-triazine-2,4,6-trione; and triallyl-1,3,5-triazine-2,4,6-trione.

15. The process of claim 14 wherein the compound is triallyl-1,3,5-triazine-2,4,6-trione.

16. The process of claim 1 wherein the compound is a oxazolidone.

17. The process of claim 16 wherein at least one of $R^1$ or $R^2$ is selected from hydrogen; alkyl or alkylene groups; alkyl or alkylene groups having at least one hydroxy group; carboxyalkyl groups or salts thereof; and each alkyl group has from 1 to about 6 carbon atoms.

18. The process of claim 16 wherein the compound is selected from the group consisting of 2-oxazolidone; 3-methyl-2-oxazolidone; 5-methyl-2-oxazolidone; 3-(2-hydroxyethyl)-2-oxazolidone; 4,5-dimethyl-2-oxazolidone; 3-(2-hydroxyethyl)-4,5-dimethyl-2-oxazolidone; 2,4-oxazolidinedione; and 5,5-dipropyl-2,4-oxazolidinedione.

19. The process of claim 18 wherein the compound is 2-oxazolidone.

20. The process of claim 1 wherein the aqueous solution contains a concentration of the absorbent compound of at least 0.1 weight percent.

21. The process of claim 1 wherein absorption of the $SO_2$ from the fluid is conducted at a temperature of from 0° C. to about 120° C.

22. The process of claim 21 wherein the absorption of the $SO_2$ from the fluid is conducted at a temperature of from 5° C. to about 60° C.

23. The process of claim 1 wherein after contacting the $SO_2$ and the aqueous solution, there is a step of removing $SO_2$ from the aqueous solution by heating the solution to a temperature of from about 75° C. to about 150° C.

24. The process of claim 23 wherein the temperature is from about 90° C. to about 120° C.

25. The process of claim 1 wherein the absorbent has a percent regenerability of at least about 50 percent.

26. The process of claim 25 wherein the absorbent has a CS of at least about 0.5.

27. The process of claim 26 wherein the CS is at least about 0.7.

28. The process of claim 1 wherein the fluid has a concentration of $SO_2$ of from about 1 ppm by volume up to about 100 volume percent of the fluid.

29. The process of claim 28 wherein the concentration of $SO_2$ is from about 100 ppm to about 3000 ppm of the fluid.

* * * * *